(12) United States Patent
Mainguet

(10) Patent No.: US 6,459,804 B2
(45) Date of Patent: *Oct. 1, 2002

(54) FINGERPRINT-READING SYSTEM

(75) Inventor: Jean-François Mainguet, Grenoble (FR)

(73) Assignee: Thomson-CSF, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/878,966

(22) Filed: Jun. 13, 2001

Related U.S. Application Data

(63) Continuation of application No. 08/870,002, filed on Jun. 5, 1997, now Pat. No. 6,289,114.

(30) Foreign Application Priority Data

Jun. 14, 1996 (FR) .............................. 96-07419

(51) Int. Cl.⁷ ................................................ G06K 9/00
(52) U.S. Cl. ..................................... 382/124; 382/284
(58) Field of Search ............................. 382/124, 125, 382/126, 127, 135, 284, 323; 386/71

(56) References Cited

U.S. PATENT DOCUMENTS

| | | | |
|---|---|---|---|
| 4,353,056 A | 10/1982 | Tsikos | 382/124 |
| 4,385,831 A | 5/1983 | Ruell | 356/71 |
| 4,394,773 A | 7/1983 | Ruell | 382/124 |
| 4,429,413 A | 1/1984 | Edwards | 382/124 |
| 4,933,976 A | 6/1990 | Fishbine et al. | 382/4 |
| 5,177,802 A | 1/1993 | Fujimoto et al. | 382/124 |
| 5,195,145 A | 3/1993 | Backs et al. | 382/126 |
| 5,321,765 A | 6/1994 | Costello | 382/125 |
| 5,546,471 A | 8/1996 | Merjanian | 382/124 |
| 5,548,394 A | 8/1996 | Giles et al. | 356/71 |
| 5,559,504 A | 9/1996 | Itsumi et al. | 340/825.31 |
| 5,587,533 A | 12/1996 | Schneider et al. | 73/614 |
| 5,596,454 A | 1/1997 | Hebert | 382/124 |
| 5,689,576 A | 11/1997 | Schneider et al. | 382/124 |
| 5,719,950 A | 2/1998 | Osten et al. | 382/115 |
| 5,721,624 A | 2/1998 | Kumashiro et al. | 382/284 |
| 5,745,555 A | 4/1998 | Mark | 379/93.03 |
| 5,757,278 A | 5/1998 | Itsumi | 340/825.31 |
| 5,999,662 A | 12/1999 | Burt et al. | 382/284 |

FOREIGN PATENT DOCUMENTS

FR 2 674 051 9/1992

*Primary Examiner*—Yon J. Couso
(74) *Attorney, Agent, or Firm*—Oblon, Spivak, McClelland, Maier & Neustadt, P.C.

(57) ABSTRACT

A fingerprint-reading system includes a fingerprint sensor having an active surface sensitive to the pressure and a temperature of a finger. The surface area of this sensor is far smaller than the surface area of the fingerprint to be read. The reading is done when the sensor and the finger are in contact and in a relative motion of sliding of the sensor and the finger with respect to each other. The system reconstitutes a complete image of the fingerprint from the partial images given by the sensor during this motion.

19 Claims, 4 Drawing Sheets

FINGERPRINT-READING SYSTEM

This application is continuation of Ser. No. 08/870,002 filed on Jun. 5, 1997 now U.S. Pat. No. 6,289,114.

BACKGROUND OF THE INVENTION

1. Field of the Invention

The invention relates to systems for the reading of fingerprints used especially in devices for authenticating individuals.

2. Description of the Prior Art

The many systems used to authenticate individuals, based on fingerprint analysis, comprise at least one sensor used to obtain an image of the fingerprint of the individual to be identified. In present systems, the finger is placed on the sensor whose reading surface must necessarily have a size of the order of magnitude of the size of the finger. The sensor is associated with a system of analysis used to compare the image of the fingerprint that it gives with an image of a reference fingerprint stored in an adequate medium, for example a chip card.

In most cases, the sensors give an analog type of information element and the system of analysis makes use of an operation for the digital processing of the image of the fingerprint which must be digitized at output of the sensor by means of an analog-digital converter. In certain embodiments, the sensor delivers the digitized image directly.

Fingerprint reading systems are often based on the use of optical devices such as a video camera picking up the image of the finger but a simple photograph of the same finger can be used to obtain the same image at output of the camera and thus defraud the system. To overcome this drawback, certain systems use prisms or microprisms in order to ascertain that it is really a genuine finger and not a photograph that is being placed before the sensor, the light being reflected only at the places where the lines of the fingerprint do not touch the prism. A photograph then becomes inoperative. However, the optical systems cannot be used to ascertain that the finger that has been placed before the sensor is truly a live finger and is not for example a mold. The optical systems have other drawbacks such as for example their great volume and high production cost.

Other means have been proposed to make devices for the authentication of individuals by fingerprints, making use of the batch-processing possibilities of the semiconductor industry, which are therefore potentially less costly and provide advantages of the integration of the sensor and of all or a part of the data-processing sequence of the authentication device, especially the operations of image digitizing at output of the sensor, the storage of the reference image and authentication. The fingerprint-reading sensor has a matrix of sensitive elements organized in rows and columns, giving an electric signal that differs depending on whether a ridge of the fingerprint line touches or does not touch a sensitive element of the sensor.

Patents have been filed on various means of reading fingerprints:

the U.S. Pat. No. 4,353,056 describes a principle of reading based on the capacitance of the sensitive elements of the sensor.

Other systems comprise sensors having components sensitive to pressure, temperature or else to pressure and temperature converting the spatial information of pressure and/or temperature into an electric signal that is then collected by a semiconductor-based multiplexer which may for example be a CCD matrix. The U.S. Pat. No. 4,394,773 describes a principle of this kind.

The sensors based on the piezoelectric and/or pyroelectric effects are the most valuable for they are sensitive to pressure and/or to heat exerted on their sensitive elements. This feature makes it possible to ascertain, during the reading of fingerprints, that the finger is truly part of a living individual through the inherent heat that it releases. It is also possible to detect the variations due to the flow of blood in the finger, inducing a variation of heat and/or pressure, thus providing for greater reliability in the authentication of the fingerprint.

These types of sensors, which can be directly integrated into a semiconductor substrate, have drawbacks that hamper their entry into the market. The surface area of the sensor necessarily has the order of magnitude of the size of a finger, namely about several square centimeters to about ten square centimeters when it is desired to have the entire first phalanx of the finger which in this case has to be rolled on the sensor so as to have the entire fingerprint on the sensor. This reduces the number of individuals that can be authenticated by means of a silicon wafer. The efficiency of manufacture of silicon wafers diminishes in proportion to their surface area and thus considerably increases the cost of manufacture.

The electric signal given by the sensors integrated into a semiconductor substrate is fleeting and a specific system is necessary to maintain it in time for the electric charges are induced by variations of the physical effects (temperature, pressure, etc.) on the sensor. As a consequence, the signal at its output tends to disappear when the physical effects are balanced. The time constants of disappearance of the signal are in the range of some milliseconds to some seconds in favorable cases.

The practical result of this is that a series of images is produced starting from the time when the finger is placed on the sensor. The quality of contrast of these images is not stable and they tend to fade away. This complicates the task of the recognition system for it is then necessary to analyze all the images that are being constantly produced by the sensor in order to find the one most appropriate for authentication.

Systems with excitation external to the sensor have been proposed, for example the sending of an energy beam in the form of microwaves, but they complicate the system and increase its volume and cost.

It is possible to overcome the effects of the disappearance of the image of the fingerprint by means of an electronic memory. However this complicates the designing of the sensor and increases its cost of manufacture for it requires technology that enables memory storage. It is very difficult to build a system that is sufficiently precise, reliable and inexpensive, and capable of deciding which is the best image among those produced by the sensor.

SUMMARY OF THE INVENTION

The present invention proposes to overcome the drawbacks of the prior art by proposing a fingerprint-reading system comprising means for reading a fingerprint when the finger and a sensor belonging to the reading means are in contact and in a relative motion of sliding of the sensor and the finger with respect to each other and means to reconstitute an image of the fingerprint from partial images obtained during this motion.

A sliding of the finger on a sensor fixed to a frame or the sliding of a mobile sensor on a finger that is held stationary or more generally the sliding of the finger and of the sensor with respect to each other stabilizes the quality of the image given by the sensor. Indeed, when there is a sliding of the finger on the sensor, the physical variations at each sensitive element of the sensor are permanent for the lines of the fingerprint touch it successively with a speed that is in the same range as or faster than the time constant characteristic of the sensitive layer of the sensor. The sensor, under these conditions, provides a sequence of images with a constant quality of contrast.

Another aspect of this invention lies in the fact that, inasmuch as a relative sliding of the finger on the sensor is done, it is possible to reduce the size of the sensor to dimensions smaller than the size of the finger. For example, assuming that the finger shifts on the sensor in the direction of its length, the length of the sensor may be reduced and will no longer cover more than a small surface area of the fingerprint. In this case, the electric signals given by the sensor during a relative sliding of the finger on the sensor correspond to a succession of partial images of the fingerprint and inasmuch as the relative speed of shift of the finger with respect to the sensor does not exceed a certain maximum value, an image given by the sensor at a given instant will at least partially overlap the following one. The complete image of the fingerprint could be reconstituted by a specific processing system.

The reduction of the size of the sensor and hence its surface area will have the consequence of providing a major reduction of its cost of manufacture.

The invention proposes a sensor belonging to the fingerprint-reading means wherein the surface area of the sensor is smaller than the surface area of the fingerprint and delivers only partial images of the complete fingerprint. The reconstruction of the complete image of the fingerprint is obtained by the superimposition of successive images given by the sensor during its relative shift with respect to the finger.

BRIEF DESCRIPTION OF THE DRAWINGS

Other features of the invention shall appear from the detailed description of the following embodiments, this description being made with reference to the appended drawings, of which.

MORE DETAILED DESCRIPTION

Figure 1:
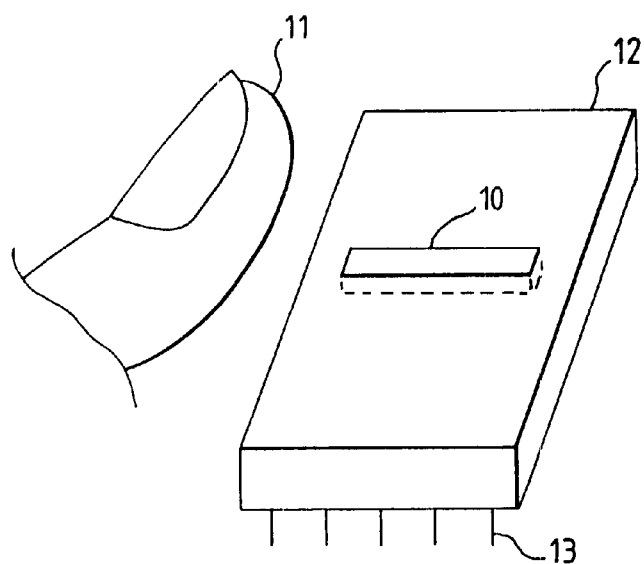
FIG. 1 shows a general view of the fingerprint sensor.

FIG. 1 shows a general view of an exemplary embodiment of a fingerprint sensor according to the invention. The fingerprint sensor 10 is an integrated circuit having the shape of a small bar with a width that substantially equal to that of a finger 11. For example its width is 1 or 2 centimeters. However its length is far smaller than its width. For example its length is some millimeters. The fingerprint sensor 10 partially covers the fingerprint to be read. The sensor is contained in a support 12 comprising external connection pins 13.

In one embodiment, the integrated circuit consists of an active layer of pyroelectric/piezoelectric material placed between an upper electrode and a matrix array of lower electrodes. The lower electrodes lie on a semiconductor substrate in which there is formed an integrated electronic circuit capable of processing the electric charges generated by the pyroelectric/piezoelectric layer on each of the electrodes of the array. This integrated electronic circuit is connected to external connection pins which can transmit electric signals, all of which represent an image of a pattern of pressure exerted on the active layer. The constitution of the lower electrodes in the form of a matrix array enables the making of an array of individual pyroelectric/piezoelectric sensitive elements even if the pyroelectric/piezoelectric layer is continuous. The matrix array of sensitive elements is organized in rows and columns.

The sensitive elements of the sensor are generally square-shaped. The sensitivity of the sensitive elements is proportional to their surface area. It is possible to increase the sensitivity of the sensitive elements by increasing their surface area. This can be done for example, while keeping the same width of sensitive element, by increasing its length in the direction of relative shift of the finger with respect to the sensor. For example, in the case of a relative shift of the finger with respect to the sensor in the direction of the columns of the matrix of sensitive elements, it is possible in practice to double their sensitivity by making rectangular sensitive elements whose length in the direction of the columns is twice their width in the direction of the rows of the matrix of sensitive elements. This has the advantage of increasing the quality of definition and contrast of the images given by the sensor.

Figure 2:
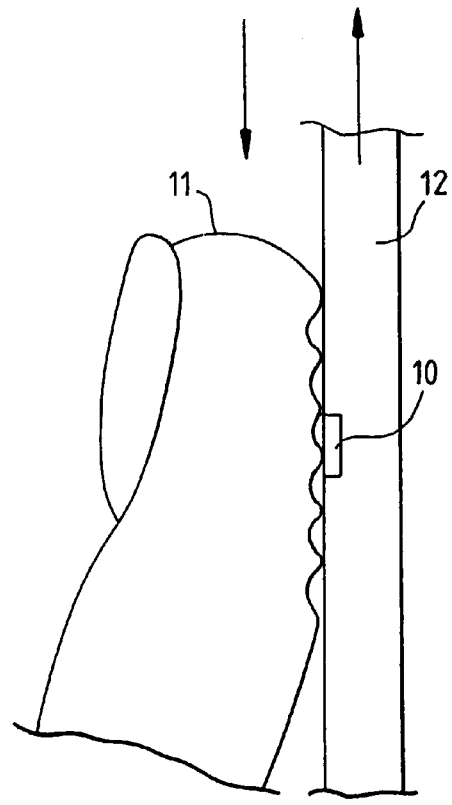
FIG. 2 shows the use of the fingerprint sensor.

FIG. 2 shows the finger 11 when it is pressed on the active surface of the integrated circuit at a given point in time during its relative shift on the sensor 10. A pressure pattern is generated in the pyroelectric and piezoelectric layer and this pattern is detected by the matrix array. The detection is done in the form of a measurement of variation of charges generated in the different pyroelectric/piezoelectric elements of the array. These variations of charges are obtained on the lower electrodes of the array. The electric signals given by the sensor correspond to an image of the patterns of pressure and temperature applied to the active surface of the sensor at a given instant. If these signals were to be used to display this image at a given instant, an image would be observed, representing a part of the imprint of the finger pressing on the sensor at a given point in time during its relative shift on the sensor.

In another embodiment of the invention, the sensitive elements of the matrix of the sensor are formed by capacitive elements used to pick up the matrix pattern of capacitance created by the ridges and hollows of the finger sliding on the surface of the sensor. The matrix pattern of the capacitance is converted by the sensor into electric signals which, as in the case of the previous embodiment, correspond to a part of the finger at a given point in time in its relative shift on the sensor.

In order to reduce the cost of the system, it would be possible to use a sensor comprising only one row of sensitive elements and carry out a relative shift of the finger in a direction substantially perpendicular to the row of sensitive elements. However, in this case, it would be necessary to have precise knowledge of the speed of relative shift of the finger with respect to the sensor at all times during the shift in order to obtain an undistorted reconstitution of the complete image of the fingerprint. One way to reconstitute the image without distortion would be to lay down the relative speed of shift of the sensor with respect to the finger, for example by using a sensor drawn by a servo-controlled motor, with the finger being held stationary.

In a very low-cost fingerprint authentication system according to the invention, it would be possible to use a sensor with only one row of sensitive elements, and without any knowledge by the system or any imposition by the system of the speed of relative shift of the finger on the sensor. Indeed, although the fingerprint cannot be reconstituted in its exact shape, it could be authenticated by means of an appropriate image-processing algorithm.

In order to overcome these constraints, the sensor must have several rows of sensitive elements used for the reconstitution, by the reading system, of the complete image of the fingerprint. Preferably, the number of rows of the sensor will be as small as possible in order to obtain a sensor with a very small surface area and therefore at low cost.

The minimum number of rows needed for the sensor depends on:

the size of the sensitive elements of the sensor (pixels), the relative speed of the finger with respect to the sensor, the number of images per second that can be delivered by the sensor for it is absolutely necessary to have sufficient overlapping between two successive images, the efficiency of the algorithm for the processing of the partial images coming from the sensor, enabling full reconstitution of the image of the fingerprint.

There should be overlapping by at least one row between two successive images given by the sensor but, in practice, overlapping by about five to six rows appears to be necessary in order to overcome certain defects of the sensor and make the system more tolerant to losses of image quality, given that the average distance between two consecutive lines of the fingerprint is about 120 micrometers. The sensor must have a number of rows sufficient to enable the to reconstitution, without excessive difficulty, of the complete image of the fingerprint. The number of rows may be established as follows:

Let it be assumed that the distance between two consecutive sensitive elements is about 50 micrometers and that the width of the active zone of the sensor is 2.5 centimeters. Each row of the sensor will have 500 sensitive elements. Taking a sensor with 40 rows (namely a sensor length of 2 millimeters), the total number of sensitive elements to be read will be 20,000. Should the reading speed be limited to one million sensitive elements per second, the sensor will give 50 images per second. If we take a value of overlapping on the length of the images equal to 10 sensitive elements, namely 10 rows, then the maximum shift of the finger between two consecutive images should not exceed 30 sensitive elements between two images, giving 1500 micrometers in 20 milliseconds, or 7.5 centimeters per second. This is a reasonable speed for the relative shift of the finger with respect to the sensor.

The reduction of the number of rows of the sensor gives more images per second for one and the same speed of reading of sensitive elements per second, but the maximum distance that can be travelled by the finger on the sensor is reduced proportionately. It is necessary rather to increase the frequency of reading of the sensitive elements to enable the acceptance of greater speeds of relative shift of the finger on the sensor.

The dimensions of the active surface of the sensor will preferably range from 1 centimeter to 2.5 centimeters for the width and will be less than 5 millimeters for the length.

It is possible, although this would make the electronic processing more complex, to consider the use of a sensor with a width far smaller than that of a finger provided that the finger is made to pass several times over the sensor (or the sensor is made to pass several times over the finger) to cover the entire desired surface of the fingerprint to be read. This makes it possible to have a small-sized sensor, hence one that is less costly to make.

Systems for authenticating individuals by their fingerprints in practice always comprise a system for the digital processing of images in order to authenticate the individuals. The simplest embodiment consists in incorporating the image reconstruction algorithm into the system comprising the authentication algorithm.

One possible approach lies in the integration, on the same substrate, of the sensor of the analog-digital converter which digitizes the image and sends the resultant data to a microprocessor comprising a read-only memory containing the reconstruction algorithm and a random-access memory containing the image reconstructed at the end of processing. This image will then be processed in a device of the system performing the identification.

These various approaches proposed are not exhaustive and other solutions of integration are possible depending on the possibilities provided by semiconductor technologies.

Figure 3:
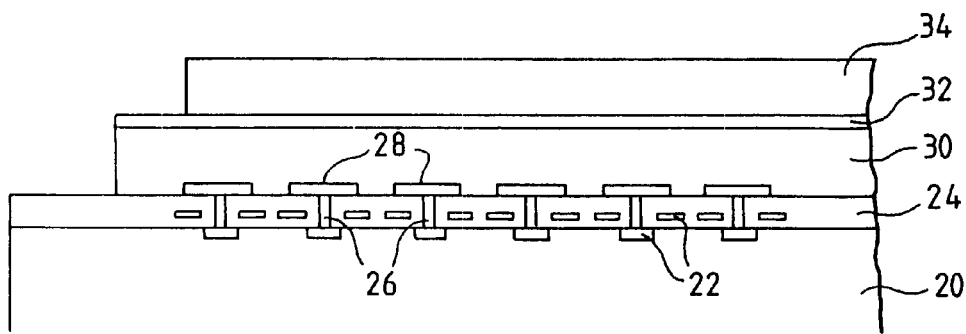
FIG. 3 shows a schematic sectional view of the constitution of the sensor.

FIG. 3 gives a schematic view of an exemplary integrated circuit constituting the fingerprint sensor according to the invention.

The integrated circuit is formed by a semiconductor substrate 20 which in principle is a silicon substrate. In this substrate there are formed circuits 22 for the reading and processing of electric charges. These circuits are for example CCD (charge-coupled devices working by charge transfer) circuits or C-MOS circuits. They are made according to the standard technologies for the manufacture of integrated circuits made of silicon. The circuits are formed in an array as a function of the matrix pattern of piezoelectric elements which will be formed subsequently.

All the signal reading and processing circuits are covered, in principle, with a planarization layer 24 which, for example, is a polyimide layer with a thickness of some micrometers, deposited by spin-coating.

The planarization layer 24 is etched periodically, as a function of the pattern of piezoelectric elements that will be formed, to make apertures 26 by which the individual piezoelectric elements can each be connected to a respective charge-reading circuit of the silicon substrate.

An array of lower electrodes 28 is formed on the planarization layer. Each electrode comes into contact, through a respective aperture 26, with a charge-reading circuit of the silicon substrate.

An active piezoelectric layer 30 is deposited on the substrate thus covered with an array of electrodes. This layer is preferably a layer of pyroelectric polymer material and it may be continuous. This layer is relatively flexible (made of a plastic polymer material). It is covered with a continuous upper electrode 32. Thus, there is defined an array of piezoelectric elements each formed by a lower electrode 28, the portion of piezoelectric layer 30 located just above it and the portion of upper electrode 32 that covers it. The electric charges generated by a pressure exerted locally on this element are read by the corresponding read circuit, electrically connected to the corresponding lower electrode through an aperture 26.

A protection layer 34, for example a polyimide layer with a thickness of about 10 micrometers, is deposited above the upper electrode 32. This protection layer must be both rigid enough and flexible enough to transmit, vertically and without modification, the pattern of pressures that is exerted on it (the finger being pressed directly on this layer).

The electronic circuits of the substrate 20 are connected to the exterior by means of pads of contacts (not shown), located on the surface of the circuit.

The material of the pyroelectric/piezoelectric layer may for example be a polyvinylidene fluoride (PVDF), polyvinylidene fluoride—trifluoroethylene (PVDF-TrFE), polyvinylidene cyanide—vinyl acetate (PVDCN-VAc) or polyvinylidene cyanide-vinylidene fluoride (PVDCN-VDF). Other sensitive layers are possible, especially those producing electric charges as a function of a physical parameter.

In the case of the above-mentioned copolymers, the main effect used is that of the generation of the electric charges induced by the variation in temperature and/or pressure of the copolymer. This variation in temperature and/or pressure is induced by the contact of the ridges of the lines of the fingerprint with the surface of the sensor, generally constituted by a thin protective layer some tens of micrometers thick, preventing excessive lateral heat dissipation, deposited on an array of electrodes connected to the multiplexing circuit.

Hereinafter, a description shall be given of an exemplary embodiment of a system according to the invention comprising a sensor with a surface area far smaller than the surface area of the fingerprint to be read, and having a length (the number of matrix rows of the sensor) far smaller than its width (the length of the rows of the sensor), the width of the sensor in this example being at least equal to the width of the finger for which the corresponding fingerprint is to be read.

Figure 4:
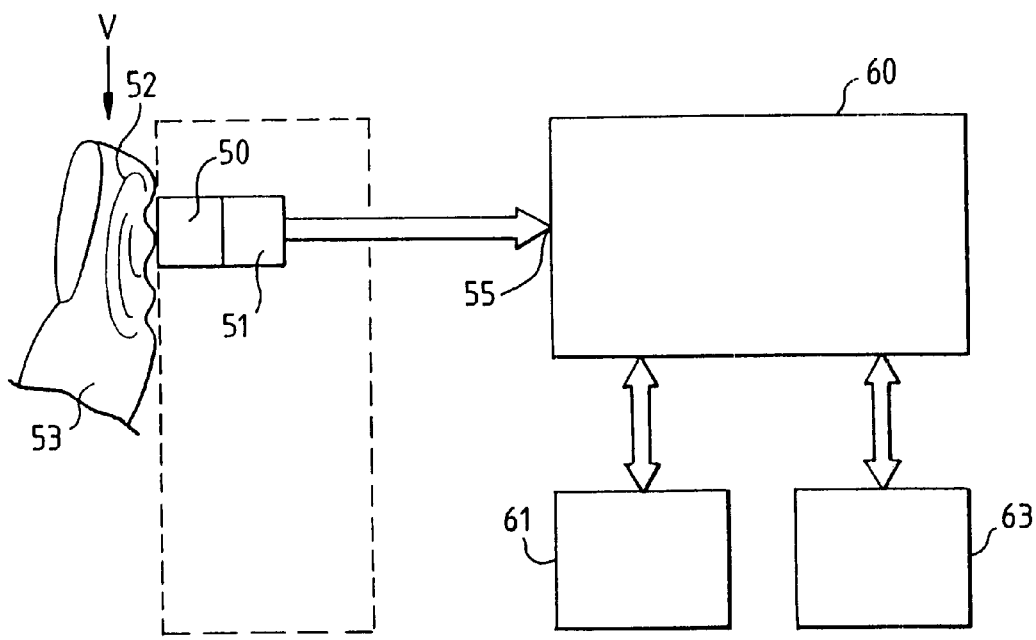
FIG. 4 shows a block diagram of an exemplary embodiment of a fingerprint reading system according to the invention.

FIG. 4 shows a block diagram of a system comprising a sensor 50 on a semiconductor substrate, having an analog/digital converter 51 integrated into the same substrate and giving digitized partial images of the fingerprint 52, for example of a finger 53, at successive points in time during a relative shift of the finger 53 on the sensor 50. The digitized partial images are presented to the processing inputs 55 of a microprocessor 60 comprising a random-access memory 61 and a read-only memory 63 containing a processing algorithm that enables the reconstruction of the complete image of the fingerprint 52 of the finger 53 and the authentication of this fingerprint.

A description shall be given of the system represented by the block diagram of FIG. 4.

Figure 5:
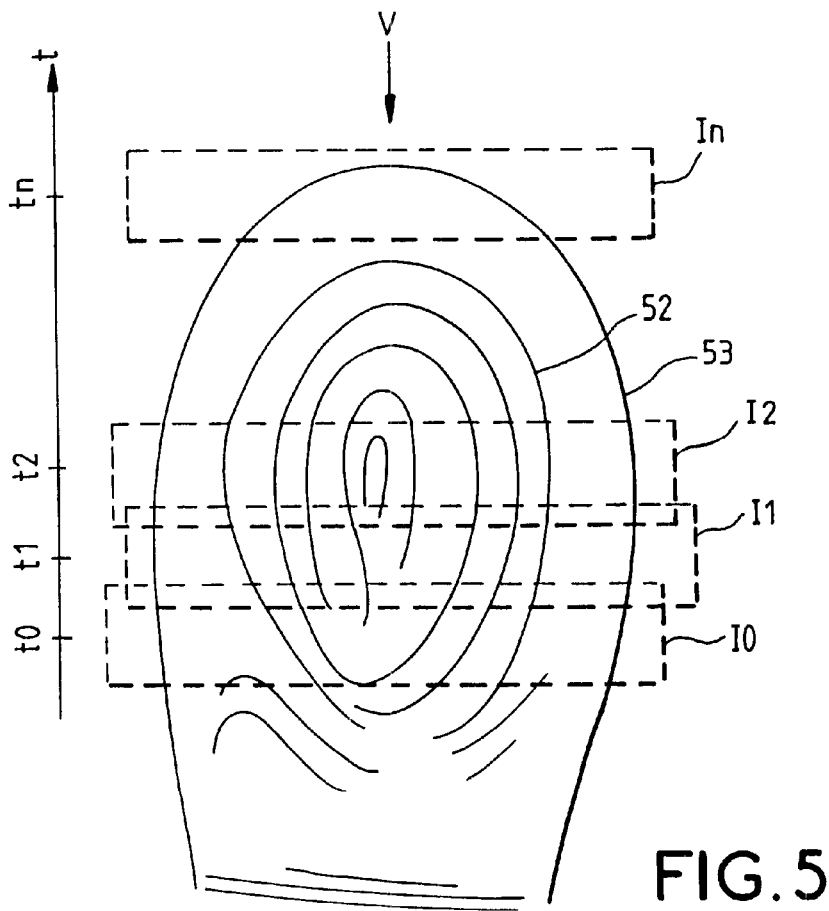
FIG. 5 shows five relative positions of the sensor of the finger at the time of the reading of the fingerprint.

Let us consider the finger 53 and its fingerprint 52, shown in FIG. 5. The finger 53 slides on the sensor perpendicularly to the rows of the matrix of sensitive elements of the sensor, in the direction V.

The different positions at the instants t0, t1, t2, . . . , tn of the active window of the sensor during its relative shift with respect to the finger 53 are shown in dashes. The sensor generates the successive images I0, I1, I2, . . . , In at the respective instants to, t1, t2, . . . , tn and the speed of relative shift of the finger on the sensor is such that at least one image partially overlaps the next one. For example I0 partially overlaps I1, I1 partially overlaps I2 and so on and so forth.

To give a clearer view of the relative motion of the finger 53 with respect to the sensor 50 in FIG. 5, the finger 53 is shown as being stationary and the sensor 50 is shown as being mobile with respect to the finger. The working of the system would be the same in the case of a mobile finger and a stationary sensor or more generally a mobile finger sliding on a mobile sensor. The parameter to be considered is the relative motion of the finger and of the sensor with respect to each other, in a direction substantially perpendicular to the width of the sensor.

Figure 6:
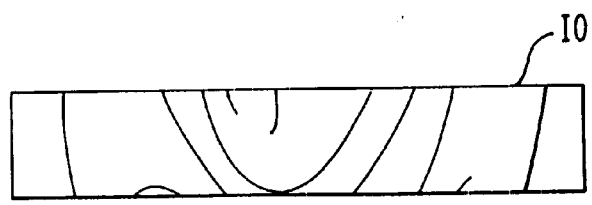
FIGS. 6 and 7 show two consecutive images at output of the sensor.
Figure 7:

Let the initial instant to be taken as the instant of reading of the first partial image I0 of the fingerprint 52. FIG. 6 shows the first partial image I0 of the fingerprint 52 given by the sensor at the instant t0 and FIG. 7 shows the second partial image I0 of this fingerprint 52 given by the sensor at the instant following t1.

The images I0, I1, I2, . . . , In are transmitted to the processing inputs 53 of the microprocessor 60 and stored in the random-access memory 61. The algorithm located in the read-only memory 63 performs operations for the processing of the images stored in the random-access memory 61. These operations consist in successively trying out all the possible cases of overlapping between the images I0 and I1 and in assigning a correlation coefficient to each trial. The best correlation coefficient will inform the system of the optimum position of overlapping of the two images I0 and I1, and the operation will be recommenced with the next image I2 given by the sensor 50 to the microprocessor 60 and so on and so forth until the fingerprint is completely reconstituted.

Various strategies of correlation may be used in order to reconstitute the complete image of the fingerprint from the successive partial images of this very same fingerprint. For example, one correlation strategy consists in comparing the levels of all the sensitive elements of each of the first two successive images I0 and I1 for each possible case of overlapping of two images.

Figure 8:
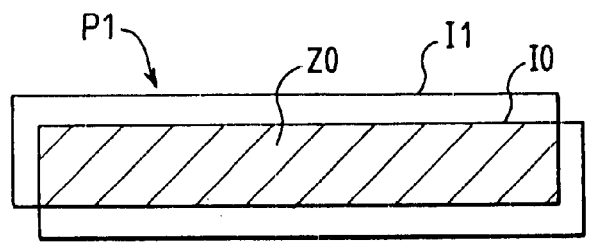
FIGS. 8, 9 and 10 show tests of the overlapping of two successive images at the output of the sensor.
Figure 9:
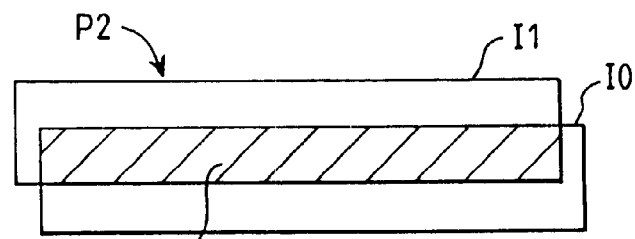

FIG. 8 shows a first trial performed by the processing algorithm of the system in a first position P1 of superimposition of the two images I0 and I1 on a zone Z0 common to the two images. The processing system compares the levels of sensitive elements of each image I0 and I1 located at the same points of the common zone Z0. If the number of sensitive elements having substantially identical levels is smaller than a predetermined value, the system modifies the position of superimposition of the two images into a following position P2 (shown in FIG. 9) corresponding to a new zone of superimposition Z1 of the images I0 and I1. The system carries out a new comparison of the levels of the sensitive elements of the two images I0 and I1 in the zone Z1. It continues to operate in this fashion for the following positions P3, . . . , Pn of the two images (shown in FIG. 10) until the number of sensitive elements with substantially identical levels located at the same points in a common overlapping zone Zn of the two images I0 and I1 is greater than a predetermined value corresponding to a probable identity of the zones Zn of the respective images I0 and I1 in the position Pn.

Figure 10:
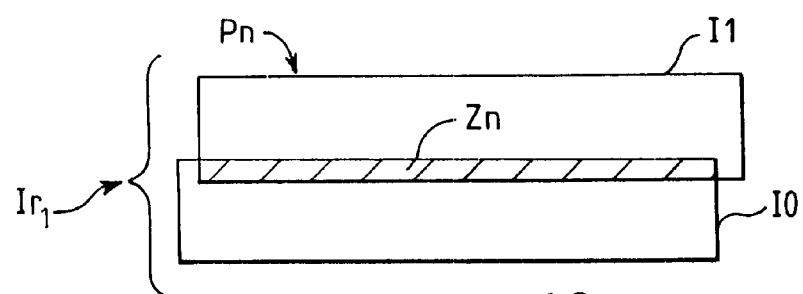

A resultant image Ir1, shown in FIG. 10, of the two images I0 and I1 could be an image coming from a weighting between the two images I0 and I1 in their optimum overlapping position Pn, enabling an improvement in the quality of the image resulting from superimposition. The image Ir1 is kept in the random-access memory of the microprocessor for the rest of the processing operation.

Figure 11:
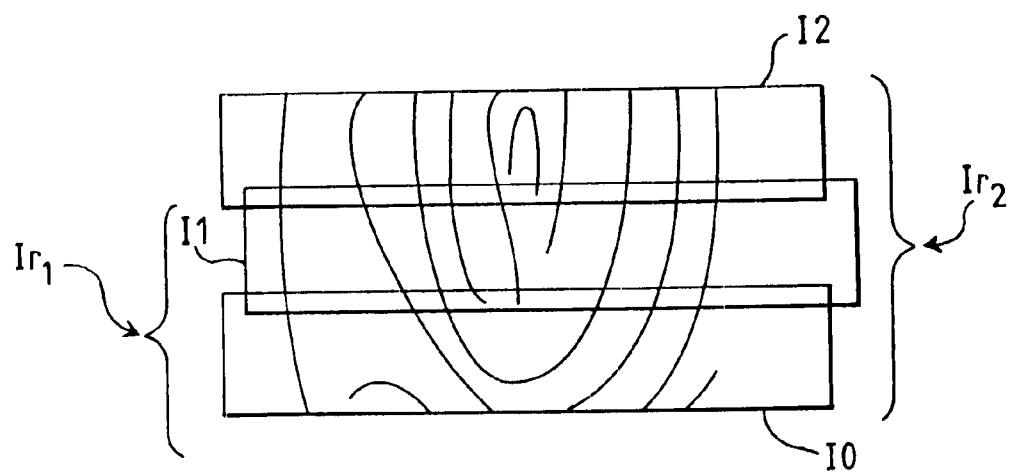
FIGS. 11 and 12 show two steps of the reconstitution of the complete image of a fingerprint.
Figure 12:
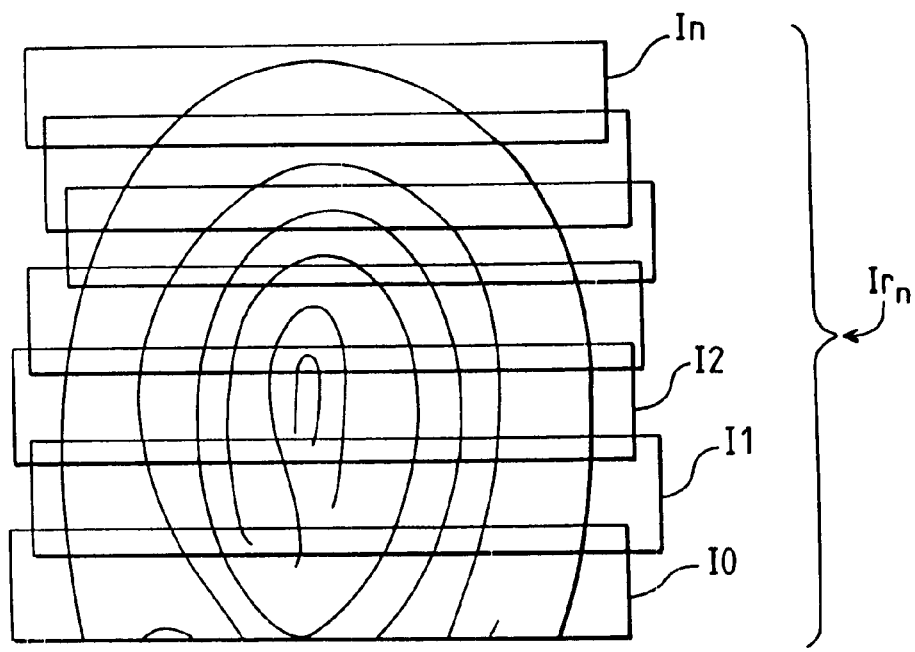

The next image I2 shown in FIG. 11 at the instant t2 at output of the sensor 50 is transmitted to the microprocessor 60. This image I2 is, in turn, compared to the resultant image Ir1 in the same way as here above enabling the obtaining of an image Ir2, shown in FIG. 11, resulting from the superimposition of I0, I1 and I2 in their optimum overlapping position. The process is repeated in the same way until the complete image Irn of the fingerprint 52, as shown in FIG. 12, is obtained.

The processing algorithm of the system could take account of the results preceding a new search for optimal superimposition between two successive images to predict the most probable position of overlapping for the next image by the fact that there is a very high probability that the relative shift of the finger with respect to the sensor will be substantially constant. This considerably accelerates the speed of processing and reconstruction of the complete image Irn of the fingerprint by avoiding unnecessary computations.

The exemplary reconstruction of the complete image is not exhaustive and other strategies of reconstruction of the complete fingerprint may be envisaged.

In particular, here above, it has been assumed for simplicity's sake that the image of the fingerprint is reconstituted dot by dot out of partial images that are also obtained dot by dot. However, in view of the fact that these images must subsequently be used for identification and that this identification will generally be done by shape-recognition algorithms that may use processing operations for the extraction of contours, operations for vectorizing these contours etc., it is also possible to envisage a case where the image reconstitution is directly done in the form of sets of contour lines or vectors representing these contours. The useful image of a fingerprint is indeed a set of contours corresponding to the ridges of the lines of this fingerprint. For authentication, the sets of contours detected are compared with sets of pre-recorded contours corresponding to an individual whose identity is to be authenticated. The sets of contours could then be stored in the form of tables of vectors describing these contours.

It is then possible to carry out a contour extraction processing operation and/or a vectorization processing operation directly on a partial image and then perform correlations on the contours of successive vectors of partial images to assemble the partial images together and establish a complete image directly in the form of sets of contours or sets of vectors.

This solution makes it possible to avoid a dot-by-dot reconstitution of an image when this image would in any case have to be converted into a set of contours.

In other embodiments, the width of the sensor may be smaller than the width of the finger, thus further reducing its surface area. It would be enough then to scan the entire fingerprint at appropriate speed, with the system performing the reconstitution of the complete image.

What is claimed is:

1. A process for reading a fingerprint, comprising:

obtaining a series of partial images of the fingerprint during a sliding relative motion between a finger and a sensor, said sensor having a sensing surface area smaller than a surface of area of an image on said sensor of said fingerprint to be read, and having several lines of sensing elements, each partial image partially overlapping a previous partial image, and reconstructing a global image of said fingerprint to be read by correlation of overlapping partial images.

2. A process for reading a fingerprint according to claim 1, comprising:

determining a number of said sensitive elements having substantially identical signal values in an area of overlap between two successive partial images;

comparing said number to a predetermined number; and adjusting a size of said area of overlap if said number is less than said predetermined number.

3. A process for reading a fingerprint according to claim 1, comprising:

generating first, second and third successive partial images;

matching said first and second successive images and form a first combined image; and matching said third successive image with said first combined image to form a second combined image.

4. A process for reading a fingerprint according to claim 1, comprising:

generating first and second successive partial images; and adjusting a relative position of said first and second partial images in at least two orthogonal directions to match said first and second partial images.

5. A process for reading a fingerprint according to claim 1, wherein the step of reconstructing a global image of said fingerprint to be read comprises:

shifting a selected partial image with respect to a previous image to determine an optimal position of overlapping between said given partial image and said previous image; and obtaining a new image from a shifted partial image and said previous image, said new image being larger than an image obtainable by said sensing surface.

6. A process for reading a fingerprint according to claim 1, wherein the step of reconstructing a global image of said fingerprint to be read comprises:

reconstructing a global image of said fingerprint to be read by shifting a partial image;

determining a correlation between a shifted partial image and a previous image;

determining a position of a shifted partial image which gives optimal correlation; and constructing an image from said shifted partial image and said previous image.

7. A process for reading a fingerprint according to claim 1, wherein the step of reconstructing a global image of said fingerprint to be read comprises:

reconstructing a global image of said fingerprint to be read by correlation of overlapping partial images, two successive overlapping partial images being such, due to said sliding movement, that said several lines of sensing elements receive different portions of an image of said fingerprint in said successive overlapping partial images.

8. A process for reading a fingerprint according to claim 1, wherein the step of reconstructing a global image of said fingerprint to be read comprises:

reconstructing a global image of said fingerprint to be read by correlation of overlapping partial images, said correlation comprising effecting a displacement of one or two successive partial images towards the other to determine an optimal correlation in overlapping zones of said images; and building from the two partial images an image larger than an image obtainable by the sensor.

9. A process for reading a fingerprint according to claim 1, wherein the step of reconstructing a global image of said fingerprint to be read comprises:

finding a high correlation between a first zone of pixels of one partial image and another, different, zone of pixels of another partial image; and building from said two partial images an image larger than said one and said other partial image, said larger image comprising:
   a) said one partial image, and
   b) said other partial image disclosed from an amount corresponding to a difference in position of said first and second zone of pixels in said sensing surface, said difference due to said sliding movement.

10. process for reading a fingerprint, comprising:
   obtaining a series of partial images of the fingerprint during a sliding relative motion between a finger and a sensor, said sensor having several lines of sensing elements and having a sensing surface area capable of encompassing not more than a small portion of the fingerprint to be read, each partial image formed on said sensing surface area during said sliding movement corresponding to a different part of the fingerprint partially overlapping a previous part; and
   reconstructing a global image of said fingerprint to be read by correlation of overlapping partial images.

11. A process for reading a fingerprint, comprising:
   obtaining a series of partial images of the fingerprint during a sliding relative motion between a finger and a sensor in direct contact with the finger, said sensor having a sensing surface area smaller than a surface of area of an image on said sensor of said fingerprint to be read, and having several lines of sensing elements, each partial image partially overlapping a previous partial image, and
   reconstructing a global image of said fingerprint to be read by correlation of overlapping partial images.

12. A process for reading a fingerprint according to one of claims 10 and 11, comprising:
   determining a number of said sensitive elements having substantially identical signal values in an area of overlap between two successive partial images;
   comparing said number to a predetermined number; and
   adjusting a size of said area of overlap if said number is less than said predetermined number.

13. A process for reading a fingerprint according to one of claims 10 and 11, comprising:
   generating first, second and third successive partial images;
   matching said first and second successive images and form a first combined image; and
   matching said third successive image with said first combined image to form a second combined image.

14. A process for reading a fingerprint according to one of claims 10 and 11, comprising:
   generating first and second successive partial images; and
   adjusting a relative position of said first and second partial images in at least two orthogonal directions to match said first and second partial images.

15. A process for reading a fingerprint according to one of claims 10 and 11, wherein the step of reconstructing a global image of said fingerprint to be read comprises:
   shifting a selected partial image with respect to a previous image to determine an optimal position of overlapping between said given partial image and said previous image; and
   obtaining a new image from a shifted partial image and said previous image, said new image being larger than an image obtainable by said sensing surface.

16. A process for reading a fingerprint according to one of claims 10 and 11, wherein the step of reconstructing a global image of said fingerprint to be read comprises:
   reconstructing a global image of said fingerprint to be read by shifting a partial image;
   determining a correlation between a shifted partial image and a previous image;
   determining a position of a shifted partial image which gives optimal correlation; and
   constructing an image from said shifted partial image and said previous image.

17. A process for reading a fingerprint according to one of claims 10 and 11, wherein the step of reconstructing a global image of said fingerprint to be read comprises:
   reconstructing a global image of said fingerprint to be read by correlation of overlapping partial images, two successive overlapping partial images being such, due to said sliding movement, that said several lines of sensing elements receive different portions of an image of said fingerprint in said successive overlapping partial images.

18. A process for reading a fingerprint according to one of claims 10 and 11, wherein the step of reconstructing a global image of said fingerprint to be read comprises:
   reconstructing a global image of said fingerprint to be read by correlation of overlapping partial images, said correlation comprising effecting a displacement of one or two successive partial images towards the other to determine an optimal correlation in overlapping zones of said images; and
   building from the two partial images an image larger than an image obtainable by the sensor.

19. A process for reading a fingerprint according to one of claims 10 and 11, wherein the step of reconstructing a global image of said fingerprint to be read comprises:
   finding a high correlation between a first zone of pixels of one partial image and another, different, zone of pixels of another partial image; and
   building from said two partial images an image larger than said one and said other partial image, said larger image comprising:
   a) said one partial image, and
   b) said other partial image disclosed from an amount corresponding to a difference in position of said first and second zone of pixels in said sensing surface, said difference due to said sliding movement.

* * * * *